United States Patent
Song et al.

(10) Patent No.: US 10,778,317 B1
(45) Date of Patent: Sep. 15, 2020

(54) SYSTEM AND METHOD FOR INTRA-CELL BEAM SWITCHING BASED ON CONFIGURABLE PHYSICAL LAYER EVENT DETECTION

(71) Applicant: Sprint Communications Company L.P., Overland Park, KS (US)

(72) Inventors: Minho Song, Ashburn, VA (US); Hadeel Fayad, Washington, DC (US); Sanghoon Sung, Ashburn, VA (US); Yun Sung Kim, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/518,369

(22) Filed: Jul. 22, 2019

(51) Int. Cl.
  *H04B 7/06* (2006.01)
  *H04B 17/336* (2015.01)
  *H04B 17/318* (2015.01)

(52) U.S. Cl.
  CPC ......... *H04B 7/0695* (2013.01); *H04B 7/0626* (2013.01); *H04B 17/318* (2015.01); *H04B 17/336* (2015.01)

(58) Field of Classification Search
  CPC . H04W 72/046; H04W 16/28; H04W 72/042; H04L 5/0048; H04L 5/0055; H04B 7/0695; H04B 17/318; H04B 17/336; H04B 7/0626
  See application file for complete search history.

(56) References Cited

U.S. PATENT DOCUMENTS 9,900,891 B1 * 2/2018 Islam ................. H04B 7/04
10,530,503 B2 * 1/2020 Davydov ............ H04W 72/042

OTHER PUBLICATIONS

Xingqin Lin et al. "5G New Radio: Unveiling the Essentials of the Next Generation Wireless Access Technology", article, <https://arxiv.org/ftp/arxiv/papers/1806/1806_06898.pdf>, 8 pages, Jun. 18, 2018.
Sharetechnote. "5G/NR—Beam Management", web page, <https://www.sharetechnote.com/html/5G/5G_Phy_BeamManagement.html>, 10 pages, Mar. 11, 2017, retrieved from Internet Archive Wayback Machine <https://web.archive.org/web/20170311134334/https://www.sharetechnote.com/html/5G/5G_Phy_BeamManagement.html> on Jul. 24, 2019.
Matti Passoja et al. 5g NR: Massive MIMO and Beamforming—What does it mean and how can I measure it in the field?. web page, <https://www.rcrwireless.com/20180912/5g/5g-nr-massive-mimo-and-beamforming-what-does-it-mean-and-how-can-i-measure-in-the-field>, 6 pages, Sep. 12, 2018, retrieved from Internet Archive Wayback Machine <https://web.archive.org/web/20180912171327/https://www.rcrwireless.com/20180912/5g/5g-nr-massive-mimo-and-beamforming-what-does-it-mean-and-how-can-i-measure-it-in-the-field> on Jul. 24, 2019.

* cited by examiner

*Primary Examiner* — Janice N Tieu (57) ABSTRACT

System and methods are provided for performing intra-cell beam switching based on customizable parameters for event detection. In embodiments, base station is configured with customized physical layer parameters, which the base station broadcasts. The base station uses reports of physical layer parameters of a beam, received from a user device, for example, to determine whether events have occurred that indicate beam switching should be performed. Based on the determinations, the base station may perform beam switching of the user device, in various embodiments.

20 Claims, 6 Drawing Sheets

SYSTEM AND METHOD FOR INTRA-CELL BEAM SWITCHING BASED ON CONFIGURABLE PHYSICAL LAYER EVENT DETECTION

SUMMARY

A high-level overview of various aspects of the invention are provided here for that reason, to introduce a selection of concepts that are further described in the following Detailed Description. This summary is not intended to identify key features or essential features of the claimed subject matter, nor is it intended to be used as an aid in isolation to determine the scope of the claimed subject matter. In brief and at a high level, this disclosure describes, among other things, a system and method to control and perform intra-cellular beam switching for user devices. Embodiments herein provide that a base station communicates a parameter for detecting beam-specific events via a cell site. Subsequently, a signal is received from a user device indicating a condition of a beam satisfies the parameter. The base station may then determine, based on the signal, that an event has occurred. Further, the base station may select a different beam at the cell site and assign said beam to serve the user device, thus performing beam switching on a per-device basis within the cell site.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of a system and/or method, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention may be embodied in many different forms and should not be construed as limited to the embodiments set forth herein.

Throughout the description of the embodiments, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments. The following is a list of these acronyms:

3G Third Generation Wireless Technology
3GPP Third Generation Partnership Project
4G Fourth Generation Wireless Technology
5G Fifth Generation Wireless Technology
CDMA Code Division Multiple Access
CD-ROM Compact Disk Read Only Memory
CRI Index
CSI Channel State Information
CSI-RS Channel State Information Reference Signal
DVD Digital Versatile Discs
EEPROM Electrically Erasable Programmable Read Only Memory
E-UTRAN Evolved Universal Terrestrial Access Network
gNB Next Generation Node B
GPRS General Packet Radio Service
GSM Global System for Mobile Communications
iDEN Integrated Digital Enhanced Network
LTE Long Term Evolution
MDN Mobile Device Number
NAI Network Address Identifier
OFDMA Orthogonal Frequency Division Multiple Access
PBCH Physical Broadcast Channel
PC Personal Computer
PCS Personal Communications Service
PDA Personal Digital Assistant
PMP Portable Media Player
PSTN Public Switching Telephone Network
RAM Random Access Memory
ROM Read Only Memory
RSRP Reference Signals Received Power
RSRQ Reference Signals Received Quality
SIB Signal Information Resource Block
SINR Signal to Interference Plus Noise Ratio
SMS Short Message Service
SRS Sounding Reference Signal
SS/PBCH Synchronization Signal/Physical Broadcast Channel
TDMA Time Division Multiple Access
UE User Equipment
UMTS Universal Mobile Telecommunications System
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary by H. Newton, 24th Edition (2008).

Embodiments may include, among other things: a method, system, or set of instructions embodied on one or more computer-readable media. Computer-readable media include one or more of volatile or nonvolatile media, removable or non-removable media, and computer-readable media contemplates media readable by a database, a switch, and various other network devices. In embodiments, computer-readable media comprises media implemented in any method or technology for storing information. Examples of stored information include computer-useable instructions, data structures, program modules, cloud-based storage, network-based storage, and other data representations. Media examples include information-delivery media, primary storage media such as RAM, and secondary storage media such as a hard drive. Media example may include ROM, EEPROM, flash memory, or other memory technology, CD-ROM, digital versatile discs (DVD), Blue-ray disc, holographic media, optical disc storage, magnetic cassettes, magnetic tape, magnetic disk storage, and other magnetic storage devices. These technologies may store data momentarily, temporarily, or permanently. As used herein, computer-readable storage media does not comprise a signal per se.

At a high level, embodiments herein utilize a base station that is hardcoded and configured with one or more parameters that define thresholds for one or more physical layer characteristics with regard to beams of a cell site. The base station may broadcast the one or more parameters that define a threshold from the cell site, in embodiments. When a parameter defining a threshold is received by a user equipment, the user equipment is automatically configured to utilize the threshold to generate a report when a beam satisfies the threshold of the parameter, for example, with regard to one or more physical layer characteristics of the beam. The user equipment may then send the report as information in a signal to the base station, in some embodiments. The report may be utilized by the base station and/or the user equipment to detect and determine when events occur, i.e., when a beam satisfies the threshold or other conditions specified by the parameter with regard to one or more physical layer characteristics. When it is determined that an event occurs for a beam, the base station may proceed to determine that the beam which is serving the user equipment should be "replaced" with another beam. The base station then selects and performs beam switching to assign a different beam to the user equipment to act as the serving beam, in embodiments, where the different beam is not associated with an event.

Figure 1:
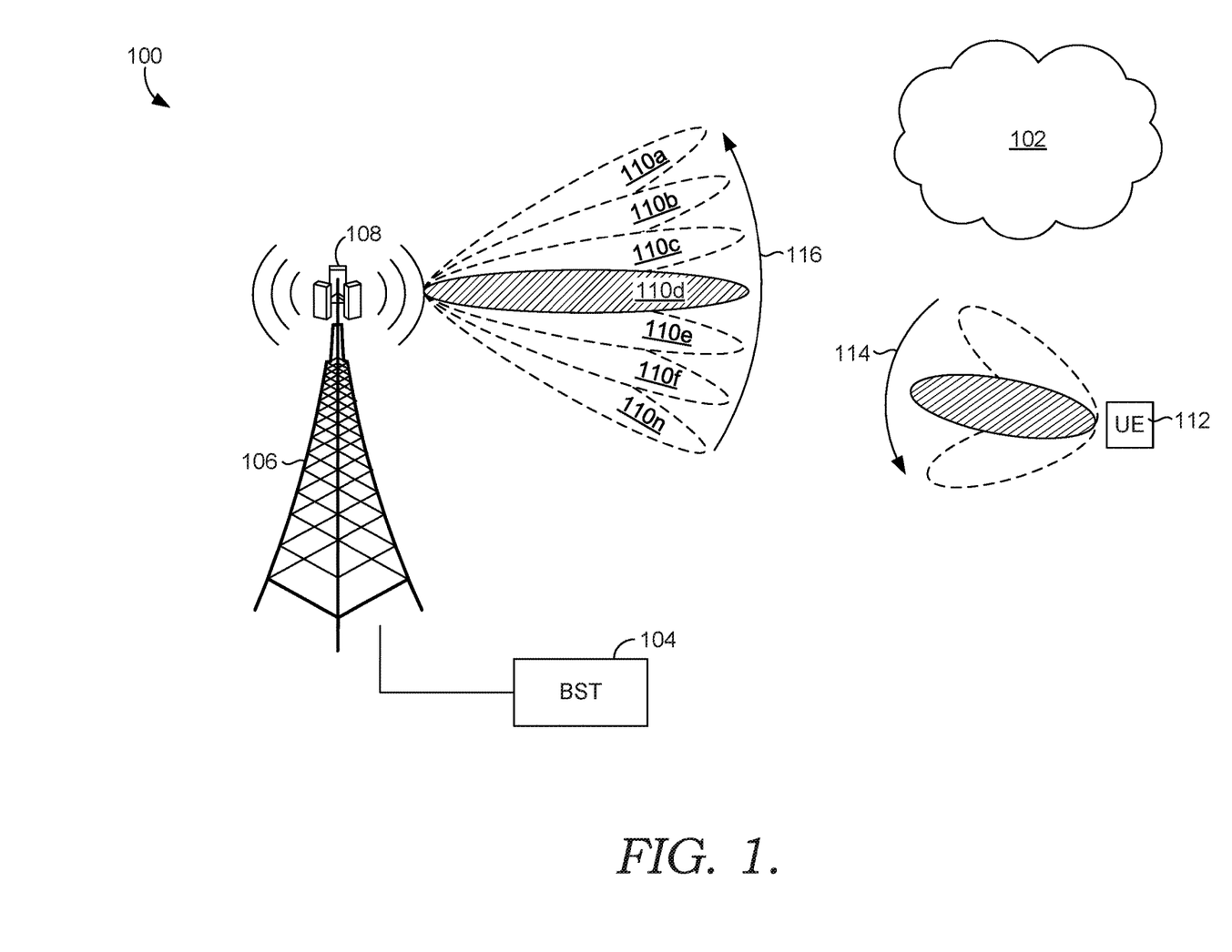
FIG. 1 depicts an example environment that is suitable for operation of an embodiment.

Turning to FIG. 1, an environment 100 is depicted for implementation of embodiments discussed herein. In various embodiments, the environment 100 includes a network 102. The network 102 may be a telecommunications network, in some embodiments. In various embodiments, the network 102 may support 3G, 4G, 5G, 5G New Radio (NR), and/or 6G technologies. In one embodiment, the network 102 is a 5G NR telecommunications network.

The environment 100 comprises a base station 104 and a cell site 106 having an media antenna 108, in embodiments. The base station 104 may be communicatively coupled to the cell site 106, in embodiments. Accordingly, the base station 104 may be configured to control the cell site 106, though the base station 104 may be co-located with the cell site 106 or remote from the cell site 106, in embodiments. As configured to control the cell site 106, the base station 104 may control one or more antenna 108 (e.g., single and/or arrays) of the cell site 106. The antenna 108 may be an array comprised of a plurality of antenna elements, in embodiments, where each individual antenna element is capable of producing one narrow, directional beam. The antenna 108 may be configured to produce analog beams, in some embodiments. The antenna 108 may support multiple-input multiple-output (MIMO), multi-user multiple-input multiple-output (MU-MIMO), cooperative MIMO, and/or massive MIMO techniques and protocols, in various embodiments. In FIG. 1, the antenna 108 produces a plurality of beams 110a-n. One or more of the plurality of beams 110a-n may associated with different directions at the cell site 106, in embodiments. Each of the plurality of beams 110a-n is transmitted in a different direction from the cell site 106, as shown in FIG. 1. The direction associated with each of the plurality of beams 110a-n may be predefined or preset, as configured by the base station 104 that controls the cell site 106 and antenna 108. For example, the direction associated with each beam may be static or semi-static. As such, coverage at the cell site 106 is defined by the coverage provided by the directionality of the plurality of beams 110a-n. As each of the plurality of beams 110a-n may be associated with a different direction, the plurality of beams 110a-n may form a grid-like coverage area.

The cell site 106 may transmit information through the plurality of beams 110a-n that are broadcast in a plurality of directions using the antenna 108. Each of the plurality of beams 110a-n may be used to transmit information, for example, using one or more of synchronization signals (SS block) or physical broadcast channel (PBCH) parameters. In some embodiments, one or more of the plurality of beams 110a-n or each of the plurality of beams 110a-n transmits, broadcasts, or communicates an "SSB." An SSB comprises a combination of a synchronization signal (SS block) with physical broadcast channel (PBCH) parameters together as a single block. Generally, the synchronization signal of the SSB provides information to user equipment in order to set up downlink synchronization, for example, in time and frequency. The synchronization signal may include a Primary Synchronization Signal (PSS) and a Secondary Synchronization Signal (SSS), in some embodiments. Generally, the PBCH of the SSB may provide system information to the user equipment. As such, when one of the plurality of beams 110a-n transmits an SSB that is received by user equipment, the user equipment uses the information therein to synchronize with the cell site 106 over the downlink and to identify the cell site 106, for example.

The antenna 108 may transmit SSBs via the plurality of beams 110a-n by performing "beam sweeping." Beam sweeping is a wireless transmission technique that may be used to send information to a coverage area of one or more beams in an attempt to generate a response from, and thus locate, user equipment within the coverage of the plurality of beams 110a-e, for example. The antenna 108 may broadcast "SS bursts" whereby a plurality of SSBs are broadcast by the antenna 108 in multiple directions via the plurality of beams 110a-e, in some embodiments. As such, an SS burst generally comprises a plurality of SSBs (i.e., a plurality of SS blocks). Further, an "SS burst set" may comprise a plurality of SS bursts. An SS burst set may be associated with a 15 to 25 millisecond synchronization periodicity, in one embodiment. Within the synchronization periodicity of the SS burst set, multiple SS bursts may be transmitted, and each SS burst refers to a group of a plurality of SSBs, for example. One or more SS bursts may be repeated within the SS burst set, for example, by transmitting an SS burst every 2, 4, or 5 milliseconds within an SS burst set synchronization periodicity having a 20 millisecond duration, in one example. Each of the SS bursts may transmit the SSBs in different directions via the plurality of beams 110a-n, and/or at different times within the SS burst set synchronization periodicity, which is reduces or minimizes interference between the beams, for example. In one example, within the 20 millisecond periodicity, 64 SSBs may be broadcast by the antenna 108 in 64 different directions at the cell site 106 using 64 different beams within the plurality of beams 110a-n.

It will be understood from the Detailed Description that the periodicity of the SS burst set and the periodicity of the SS bursts are not limited to these examples and may be configured and customized by a telecommunications carrier, for example. For simplicity, the terms "SS burst" and "SS burst set" are used interchangeably hereinafter for simplicity to refer to beam sweeping, but it will be understood from this description that the terms are not being used to constrain, omit, exclude, or limit the embodiment herein to one or more SS bursts or one or more SS burst sets.

In embodiments, beam sweeping is performed by the antenna 108 using the SS bursts. Using beam sweeping, the antenna 108 is able to identify and/or locate user equipment 112 within an expected range or predefined distance of the cell site 106. When an SSB in the SS burst is received 114 by user equipment 112 (i.e., an SSB is transmitted in one direction by one beam and user equipment is physically located within the coverage provided by the one beam in the direction in order to receive the SSB), for example, the user equipment 112 may respond over the uplink by sending a signal that comprises a unique identifier of the user equipment 112 back to the cell site 106. As such, SS bursts are used to provide initial access to the user equipment when setting up a connection between the user equipment and the network 102. In this manner, beam sweeping includes the transmission 116 of SS bursts in order to trigger user equipment responses, which allows the base station 104 to recognize each individual user equipment by the unique identifier received at the cell site 106.

Figure 2:
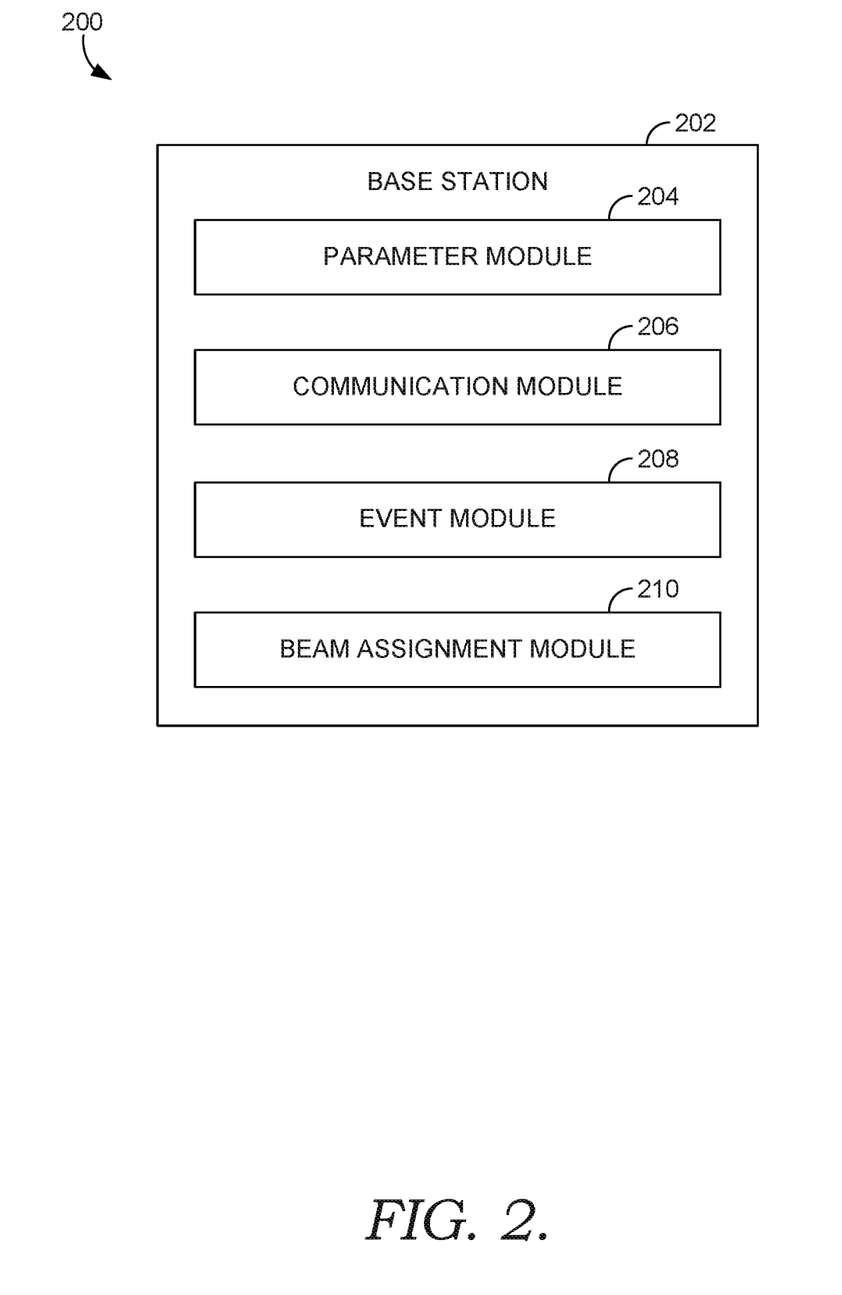
FIG. 2 illustrates an example system that is suitable for operation of an embodiment.

Not all beams at a particular cell site are created equal, however. The strength, signal power, SINR, and other signal characteristics may vary among the plurality of beams 110a-n, in embodiments. Accordingly, FIG. 2 depicts a system 200 that controls and manages intra-cell beam switching. In some embodiments, the system 200 facilitates intra-cell beam switching on a per-device basis within one cell site. For example, the system 200 may control the assignment of a narrow beam to each individual user equipment served by the cell site, and further, may control re-assignment of a different narrow beam to each individual user equipment served by the cell site based on configurable parameters.

Additionally, the system 200 pre-emptively reduces or prevents rapid beam switching of user equipment that might otherwise result from beam switching, in embodiments. Rapid beam switching refers to a "ping-pong" effect where a piece of user equipment is switched between two or more different narrow beams within a short duration of time (e.g., a scale of milliseconds to tens of seconds), such that the user equipment is bounced around between beams, for example. The rapid beam switching may degrade and/or impair the telecommunications service quality experience at the user equipment and further may overuse and/or tie-up hardware resources of the cell site and/or base station, for example. Thus, in addition to facilitating intra-cell beam switching, the system 200 prevents the problems that may arise from rapid beam switching. These aspects therefore improve the function of the system 200, the user equipment, and preserve telecommunication service quality.

In embodiments, the system 200 comprises a base station 202. In some embodiments, the base station is a Node B, an eNodeB, or a gNodeB. In an embodiment, the base station 202 is communicatively coupled with an antenna of a cell site. The base station 202 may comprise a parameter module 204 communicatively coupled to memory for storing a parameter for detecting beam events. The base station 202, in some embodiments, comprises a communication module 206 for facilitating transmission of a plurality of beams and a plurality of parameters at the cell site. In embodiments, the communication module 206 is configured to receive a signal from a user equipment indicating a condition of a first beam of the plurality of beams corresponds to the parameter, wherein the first beam is currently serving the user equipment. The base station 202 may comprise an event module 208 for determining an event occurred for the first beam based on the signal, in an embodiment. In some embodiments, the base station 202 comprises a beam assignment module 210 for selecting a second beam that is different from the first beam and assigning the second beam to currently serve the user equipment. Each of the parameter module 204, communication module 206, event module 208, and beam assignment module 210 may be encoded in software and/or hardware using memory of the base station 202. One or more parameters for physical layer characteristics may be hardcoded at the base station 202, thus configuring the base station 202 to perform the method discussed herein.

Figure 3:
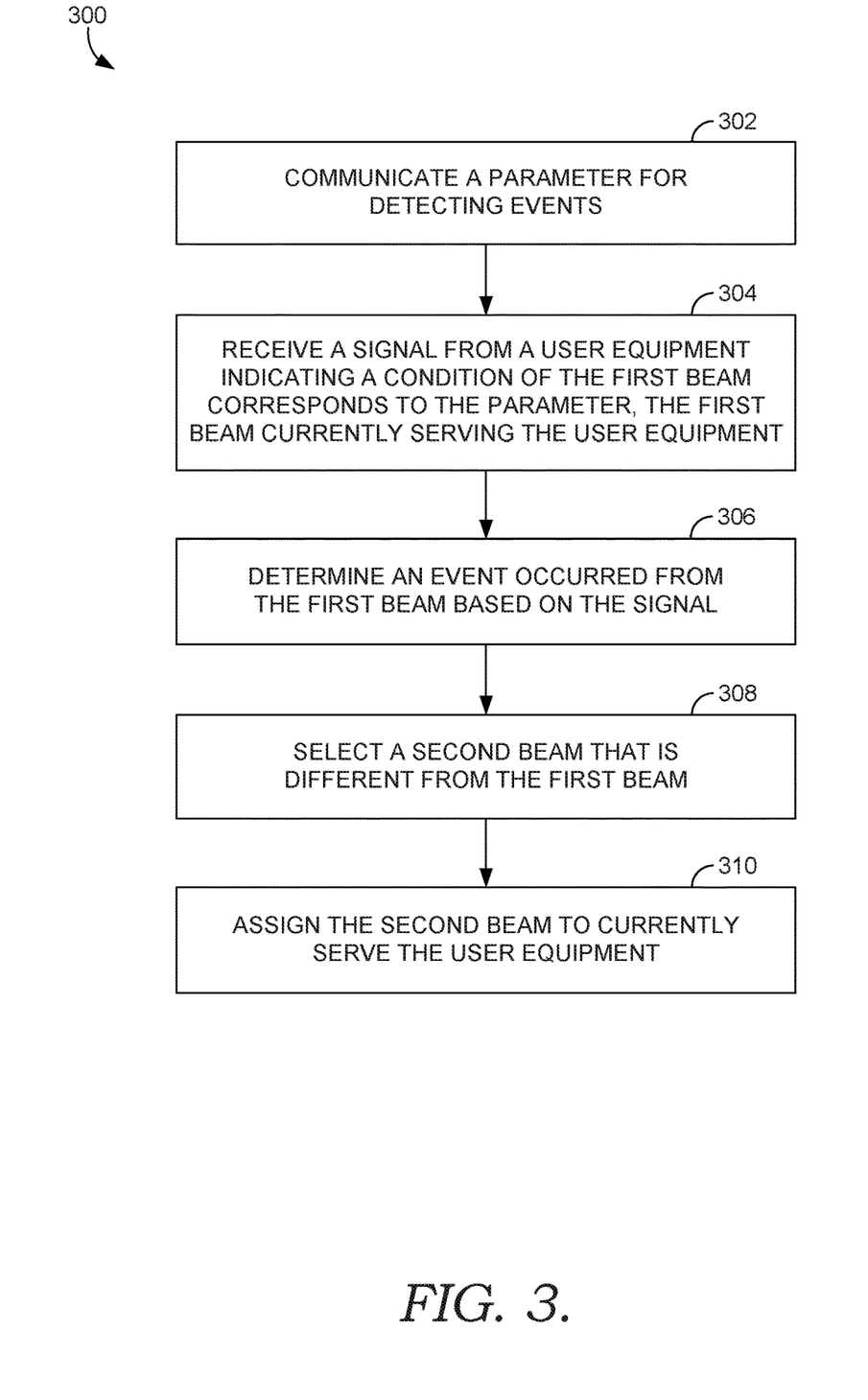
FIG. 3 is a flow diagram of a method in accordance with an embodiment.

Turning to FIG. 3, a method 300 is discussed that may be performed via one or more of the components described in FIGS. 1 and 2. As such, the method 300 is discussed briefly for brevity, though it will be understood that the previous discussion and details described therein may be applicable to aspect of the method 300 of FIG. 3. Additionally or alternatively, it will be understood that the method 300 discussed herein may be implemented or performed via the execution of computer-readable instructions stored on computer readable media, by one or more processors. For example, the method 300 may be performed using one or more executable portions configured to perform the method 300 when executed via one or more processors.

FIG. 3 depicts an example of a method 300 for facilitating intra-cell beam switching, in accordance with an embodiment. In further embodiments, the method 300 is performed on a per-device basis, such that each individual user equipment (device) is individually managed with regard to intra-cell beam switching. The method 300 comprises communicating a parameter for detecting events, shown at block 302. In some embodiments, the communication module of the system of FIG. 2, for example, may access or communicate with the parameter module to obtain one or more parameters and subsequently communicate the parameter(s). The parameter(s) may be hardcoded into a base station, for example, by an operator when the base station is deployed. The parameter(s) are customizable to the geographic location of the base station (e.g., to account for mountains, valleys, topography, and natural obstructions), the anticipated user equipment demand of the base station (e.g., to account for a base station located in a densely populated geographic area such as a city, convention center, or concert venue, or to account for a directional and/or time-of-day specific user equipment demand such as a location of a base station located along an interstate highway), and atmospheric or meteorological conditions or climate associated with the location of the base station (e.g., to account for atmospheric humidity conditions that may impact signal propagation), though the embodiments herein are not limited to configuring the parameter(s) for these example characteristics.

Figure 4:
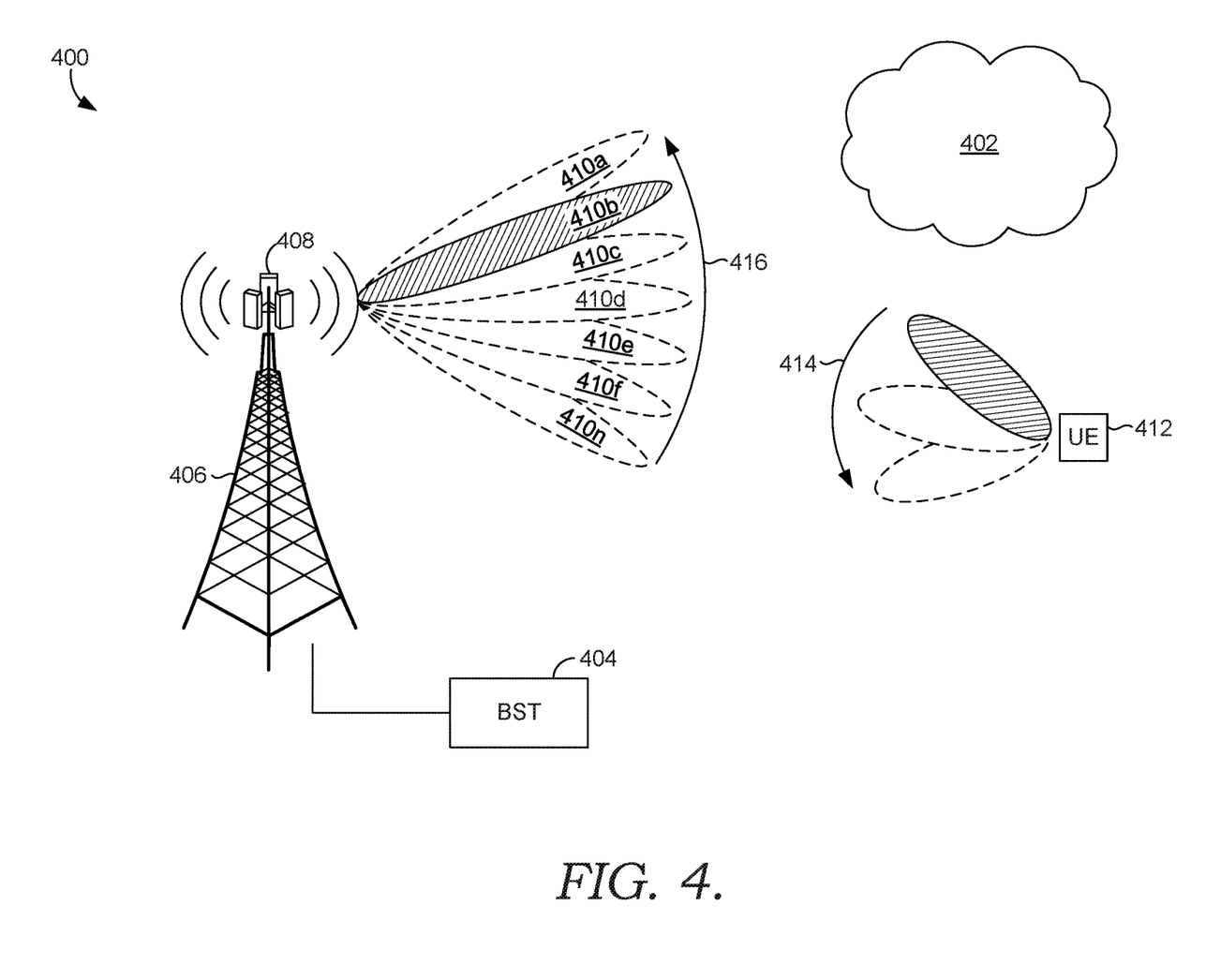
FIGS. 4 and 5 depict beam switching in the example environment of FIG. 1, in accordance with an embodiment.

In embodiments, one or more parameters are communicated by transmitting the parameter via the plurality of beams in an SS burst. For example, FIG. 4 illustrates that a plurality of beams 410a-n are used to broadcast 416 one or more parameters from a cell site 406 for receipt by user equipment 412. In further embodiments, a plurality of parameters for detecting events are communicated, for example, using one or more SS bursts. Alternatively, only one parameter may be communicated, for example, in an SS burst. The one or more parameters identify a physical layer threshold, in some embodiments. The Physical (PHY) Layer corresponds to Layer 1 in 5G technologies, for example, in contrast to the Radio Resource Control (RCC) Layer, which corresponds to Layer 3. In some embodiments, the one or more parameters correspond to one or more of a Physical Layer or a Medium Access Control (MAC) Layer. In an embodiment, the one or more parameters are packaged, by a base station, into a system information resource block (SIB) for broadcasting over the plurality of beams of the cell site. In another embodiment, the one or more parameters are communicated in a Synchronization Signal/Physical Broadcast Channel (SS/PBCH) block broadcast by the base station over the downlink. Additionally or alternatively, the one or more parameters are communicated by the base station in a Channel State Information Reference Signal (CSI-RS) over the downlink.

A parameter may specify a threshold for a particular characteristic, metric, and/or "condition" of a beam transmitted via an antenna or antenna element, in embodiments. Accordingly, in an embodiment, the parameter comprises a strength threshold. In a further embodiment, the parameter specifies a threshold for reference signals received power (RSRP). For example, the parameter may specify a threshold for RSRP that is configured between or including −140 dBm to −44 dBm. The parameter may include a quality threshold, in some embodiments. The parameter may specify a threshold for reference signals received quality (RSRQq), in one embodiment. For example, the parameter may specify a threshold for RSRQ that is configured between or including −3 dB and −19.5 dB. In yet another embodiment, the parameter comprises a noise threshold. In some embodiments, the parameter specifies a threshold for signal to interference plus noise ratio (SINR). In some embodiments, the parameter includes a combination of a strength threshold, a quality threshold, and/or a noise threshold. As such, the term "parameter" as used herein is not limited to a single threshold, and the singular term is used for simplicity of this discussion.

In some embodiments, the method 300 may communicate instructions along with the parameter. The instructions may be executed via a processor of user equipment subsequent to the receipt of the communication including the parameter and/or instructions, in embodiments. The parameter and/or the instructions may be used to automatically configure the user equipment as a portion of Radio Resource Control messaging when setting up a connection of the cell site and the user equipment, for example. The instructions may, for example, instruct the user equipment to generate and transmit a report based on measurements of one or more beams of the cell site relative to the parameter and/or relative to one another (i.e., measurement of a first beam relative to a measurement of a second different beam, in view of a parameter). Such a report may be encoded automatically into one or more signals that are sent by user equipment back to the cell site, in response to the parameter that was communicated and used to configure the user equipment. As such, a base station may communicate a parameter and instructions to the user equipment, wherein the instructions are used to automatically configure the user equipment to generate a signal that reports at least one of a condition of a first beam or a condition of a second beam relative to the parameter, for example. The instructions may specify that the user equipment periodically generate and provide a report based on the parameters and the beams. For example, the instructions may request a report be provided periodically every ten milliseconds, or every five seconds. This reporting period is configurable and customizable, and may further be configured into the base station. Alternatively, instructions may be provided in a non-periodic manner.

At block 304, the method 300 comprises receiving a signal from the user equipment indicating that a condition of the first beam corresponds to the parameter, wherein the first beam is currently serving the user equipment. The signal may be received by a base station, for example, via the communication module of the system of FIG. 2. In one instance, FIG. 4 illustrates that a first beam 410b (i.e., shown with shading for visual effect) of a plurality of beams 410a-n of a cell site 406 is currently serving the user equipment 412, thus providing a connection to the network 402 via the base station 404. The user equipment 412 may send the signal 414 indicating that a condition of the first beam corresponds to the parameter to the base station 404, for example. In one embodiment, the signal is sent by a user equipment to the base station controlling the cell site, in response to the parameter and/or instructions communicated. The signal may include one or more measurements performed at the user equipment, for example. The measurements may comprise beam characteristics, metrics, and/or conditions of a beam, such as measurements of strength and/or power with regard to the signal created by the beam when the beam transmitted the parameter that was communicated or broadcast by the base station, in embodiments. The signal from the user equipment may include a report, as previously discussed, indicating one or more measurements of one or more beams relative to the parameter, in some embodiments. For example, the signal from the user equipment may include a measurement of one beam that does not meet a minimum threshold specified by a parameter (e.g., a minimum threshold for quality such as RSRQ). In another example, the signal may include a measurement of one beam that meets and/or exceeds a maximum threshold specified by a parameter communicated by the beam from the cell site (e.g. a maximum noise threshold such as SINR). Additionally or alternatively, for example, the signal may include a measurement of a first beam that does not meet a minimum threshold specified by a parameter communicated by the beam from the cell site (e.g., a minimum threshold for quality such as RSRQ) and a measurement of a second beam that does meet the same minimum threshold specified by the same parameter communicated by the beam from the cell site. Additionally or alternatively, for example, the signal may include a measurement of a first beam that meets and/or exceeds a maximum threshold specified by a parameter communicated by the beam from the cell site (e.g. a maximum noise threshold such as SINR) and a measurement of a second beam that does not meet the same maximum threshold specified by the same parameter communicated by the beam from the cell site.

Generally, the signal may report that a first beam, which is acting as the serving beam to the user equipment, meets the criteria or criterion of the parameter(s) that were/was communicated and received by the user equipment. In some embodiments, the signal may comprise information and/or measurements that report on a plurality of beams, including the serving beam and one or more neighboring beams, relative to the one or more parameters. In one example, the signal may report that a serving beam and a plurality of neighboring beams meet the criteria or criterion of one or more of the parameter(s) that were communicated and received by the user equipment. As used herein, the "serving beam" refers to a first beam that the user equipment uses to connect to the cell site. In contrast, a "neighboring beam" refers to a second beam that is different from the first beam in direction and, in some embodiments, is not currently acting as the serving beam for the user device at issue, for example (e.g., neighboring beam may still be acting as a serving beam to a different user device). As explained hereinafter, the user equipment may be initially connected to the cell site via the first beam acting as the serving beam, and then be subsequently re-assigned or switched to the second beam, such that the second beam becomes the serving beam in some embodiments. As such, the terms "first" and "second" are used herein only to differentiate one beam from another beam for clarity, and the terms do not connote any dependency, sequence, order, timing, or relative importance, for example. Further, the term "serving beam" is generally used to discuss one beam of the cell site that is currently acting to connect the user equipment to the cell site, and thus, the particular beam acting as the serving beam may change over time and change with direction.

Returning to the method 300, the signal from the user equipment indicating that a condition of the first beam corresponds to the parameter, may refer to a physical layer condition of the first beam. In some embodiments, the signal is a feedback signal. In embodiments, the signal comprises one or more of RSRP, RSRQ, and/or SINR measurements corresponding to at least one of a condition for a first beam or a condition for a second beam. In one example, the signal corresponds to a Channel State Information (CSI) signal sent over the uplink. In such an example, the CSI signal may comprises one or more of RSRP, RSRQ, and/or SINR measurements corresponding to the condition of the first beam and/or the condition of the second beam. As such, the signal may include measurements for a serving beam (e.g., a first beam) and/or a non-serving, neighboring beam (e.g., a second beam) relative to the parameter. In such an example using an CSI signal, the user equipment performs a measurement of the beam that transmitted the parameter from the base station. In another example, whether additionally or alternatively, the signal corresponds to a Sounding Reference Signal (SRS). In such an example, the SRS signal is sent from the user equipment to the base station and the base station uses the SRS to measure one or more of RSRP, RSRQ, and/or SINR corresponding to the condition for the first beam and/or the condition for the second beam. Accordingly, the measurements of a serving beam and a neighboring beam, or a first and second beam, may be performed by the user equipment, the base station, or both, in view of the specific signal (e.g., CSI and/or SRS) transmitted by the user equipment.

In embodiments, the user equipment may provide the signal to the base station in response to the initial broadcast of the parameter via a beam. Additionally, in some embodiments, the user equipment provides additional signals on a periodic basis after the user equipment is connected to the base station to continue reporting on beam conditions relative to the parameter for one or more beams (e.g., a serving beam and one or more neighboring beams). For example, the user equipment may provide a signal as feedback to the base station for each instance of the serving beam and/or a neighboring beam satisfying one or more of the criteria or criterion specified by the parameter provided by the base station. The serving beam and the neighboring beam(s) may be measured relative to the same or different threshold(s) with regard to a parameter, in various embodiments. In one embodiment, the may be transmitted by the user equipment when both the condition of the first beam does not meet a minimum threshold of a parameter and the condition of the second beam meets the minimum threshold for the same parameter. In such an example, the condition of the second beam may be improved than the condition of the first beam, relative to strength, power, and/or quality based parameters.

Continuing to block 306, in accordance with the method 300, it is determined whether an event occurred based on the signal from the user equipment. At a high level, an event is determined to have occurred (i) when a first beam that is currently serving the user equipment becomes worse than a parameter/threshold allows, (ii) when a second beam that is not currently serving the user equipment becomes better than the first beam that is currently serving the user equipment, relative to the parameter/threshold, (iii) when a second beam that is not currently serving the user equipment becomes better than a parameter/threshold, and/or (iv) when the first beam that is currently serving the user equipment become worse than a parameter/threshold while concurrently the second beam that is not currently serving the user equipment becomes better than the parameter/threshold. In some embodiments, the event module of the system of FIG. 2 may perform determinations of events based on the signal received that indicates a condition of a first beam or a second beam corresponds to the parameter, for example, based on the condition scenarios (i)-(iv) indicated above.

In one embodiment, the event is determined when the condition of the first beam is less than the physical layer threshold specified by the parameter. The condition may be a quantified measurement of a beam, represented by a numerical value, for example. In various embodiments, the parameter may specify a threshold and a margin relative to the threshold. For example, the one or more parameters may specify a physical layer threshold such that an event is determined when the condition of the first beam plus a margin value is less than the physical layer threshold. Further, such an event may be determined to have terminated or may be "void" when the condition of the first beam less the margin value meets or exceeds the threshold, in some embodiments. As will be discussed hereinafter, the margin is a value that is relative to the threshold. For example, the margin may specify a plus and/or minus values relative the threshold. As such, the margin may be a range of values beneath the threshold, a range of values over the threshold, or a range of values that flank the threshold, in various embodiments. Similar to the threshold, the margin is customizable and may be configured to suit the operations of the base station (e.g., geographic location, the user equipment demand, and atmospheric conditions or climate). For simplicity, "parameter" and "threshold" are referred to interchangeably herein for simplicity, but it will be understood that the "parameter" and "threshold" may also include or otherwise specify a margin, and thus, the terms are not constraining or limiting so as to exclude a margin, unless explicitly stated otherwise.

In an embodiment, the parameter may comprise a strength threshold such that an event is determined to have occurred when the condition of the first beam is less than the strength threshold (e.g., when the condition of the first beam satisfies the parameter of RSRP). In some embodiments, the parameter may comprise a quality threshold such that an event is determined to have occurred when the condition of the first beam is less than the quality threshold (e.g., when the condition of the first beam satisfies the parameter of RSRQ). When the parameter comprises a noise threshold, in an embodiment, an event is determined to have occurred when the condition of the first beam is less than the noise threshold (e.g., when the condition of the first beam satisfies the parameter of SINR). In further embodiments, the parameter comprises one or more of a strength threshold, a quality threshold, and/or a noise threshold, such that an event is determined to have occurred when the condition of the first beam is less than at least one of the strength threshold, the quality threshold, and/or the noise threshold. In one embodiment, the parameter comprises two or more of a strength threshold, a quality threshold, and/or a noise threshold, such that event is determined to have occurred when the condition of the first beam is less than two or more of the strength threshold, the quality threshold, and/or the noise threshold. In some embodiments, the event is determined based on one or more conditions of only the first beam that is currently acting as the serving beam to the user equipment.

However, in some embodiments, an event is determined based on a condition of a second beam, such as a neighboring beam that is not currently serving the user equipment. In one embodiment, the one or more parameters identify a physical layer threshold, and an event is determined when the condition of the second beam less a margin value exceeds the physical layer threshold. In some embodiments, the one or more parameters comprise a strength threshold such that an event is determined when the condition of the second beam that is not currently serving the user device is greater than or equal to than the strength threshold (e.g., satisfies the parameter of RSRP). In an embodiment, the one or more parameters comprise a quality threshold such that an event is determined when a condition of the second beam that is not currently serving the user device is greater than or equal to than the quality threshold (e.g. satisfies the parameter of RSRQ). In another embodiment, the one or more parameters comprise a noise threshold such that an event is determined when a condition of the second beam that is not currently serving the user device is greater than or equal to than the noise threshold (e.g., satisfies the parameter of SINR). In further embodiments, the one or more parameters comprise at least one of a strength threshold, a quality threshold, or a noise threshold, such that event is determined to have occurred when the condition of the second beam is less than at least one of strength threshold, a quality threshold, or a noise threshold. In one embodiment, the one or more parameters comprise two or more of a strength threshold, a quality threshold, or a noise threshold, such that event is determined to have occurred when the condition of the second beam is less than two or more of strength threshold, a quality threshold, and/or a noise threshold. Additionally, in some embodiments, the parameter specify a physical layer threshold and a margin, such that an event is determined when the condition of the second beam exceeds the physical layer threshold. In one such embodiment, the event is terminated or is "void" when the condition of the second beam plus a margin exceeds the physical layer threshold. Accordingly, in some embodiments, the event is determined based on one or more conditions of only the second beam.

In various embodiments, an event is determined based on both the condition of the first beam and the condition of the second beam relative to same one or more parameters, such that the first beam that is currently serving the user equipment is considered as well as a neighboring beam that is not currently serving the user equipment when determining events. For example, the one or more parameters may identify a physical layer threshold and margin such that an event is determined when the condition of the first beam plus an offset is less than the condition of the second beam less a margin. Such an event may be determined to have terminated when the condition of the second beam plus the margin is less than the condition of the first beam plus the offset, in such an embodiment. In some embodiments, the offset is a different value or value range than the margin. In other embodiments, the offset and the margin are the same value or value range. The offset refers to a specific value configured for determining events that account for beam-to-beam comparisons. For example, in one embodiment, the offset is a value that is specific to the frequency used by the first beam and/or is specific to the particular base station. The offset may be configured between and including +24 dB to −24 dB, for example. The margin, in contrast, is a value that is relative to the parameter and/or threshold and which is used for event determinations of one beam relative to the parameter and/or threshold, independent of other beams. For example, the margin may be configured between 0 and up to 30 dB, in one example. In embodiments that consider both a first beam and a second beam for event determination, the offset may be used specifically to account for beam-to-beam comparisons in view of the parameter. In contrast, for example, the margin may be used for beam-to-parameter determinations.

In another embodiment, the one or more parameters specify a physical layer threshold and a margin such that an event is determined when both the condition of the first beam plus a margin is less than the physical layer threshold, and the condition of the second beam less the same margin is greater than the physical layer threshold. Such an event may be determined to have terminated or be void when both the condition of the first beam less the margin is greater than the physical layer threshold, and the condition of the second beam plus the margin is less than the physical layer threshold. In some embodiments, the same physical layer threshold may be used to make event determinations for both the first and second beams. Alternatively, a physical layer threshold may be used to determine an event for a first beam while a different physical layer threshold may be used to determine the event for the second beam.

Accordingly, the one or more parameters (e.g., specifying a threshold, and further, a margin in some embodiments) may be used to configure the base station and broadcast to user equipment. Using the parameter(s) as indicated above, the user equipment may provide information to the base station in the signal with regard to the condition of the first and/or second beams as they satisfy the threshold or other criteria of the parameter. Using this information, the base station may determine that an event has occurred for the first and/or second beam, as discussed above. When an event is determined, the base station may further determine that the user equipment should be switched from the first beam that is currently serving the user equipment to a second neighboring beam that was not serving the user equipment.

Figure 5:
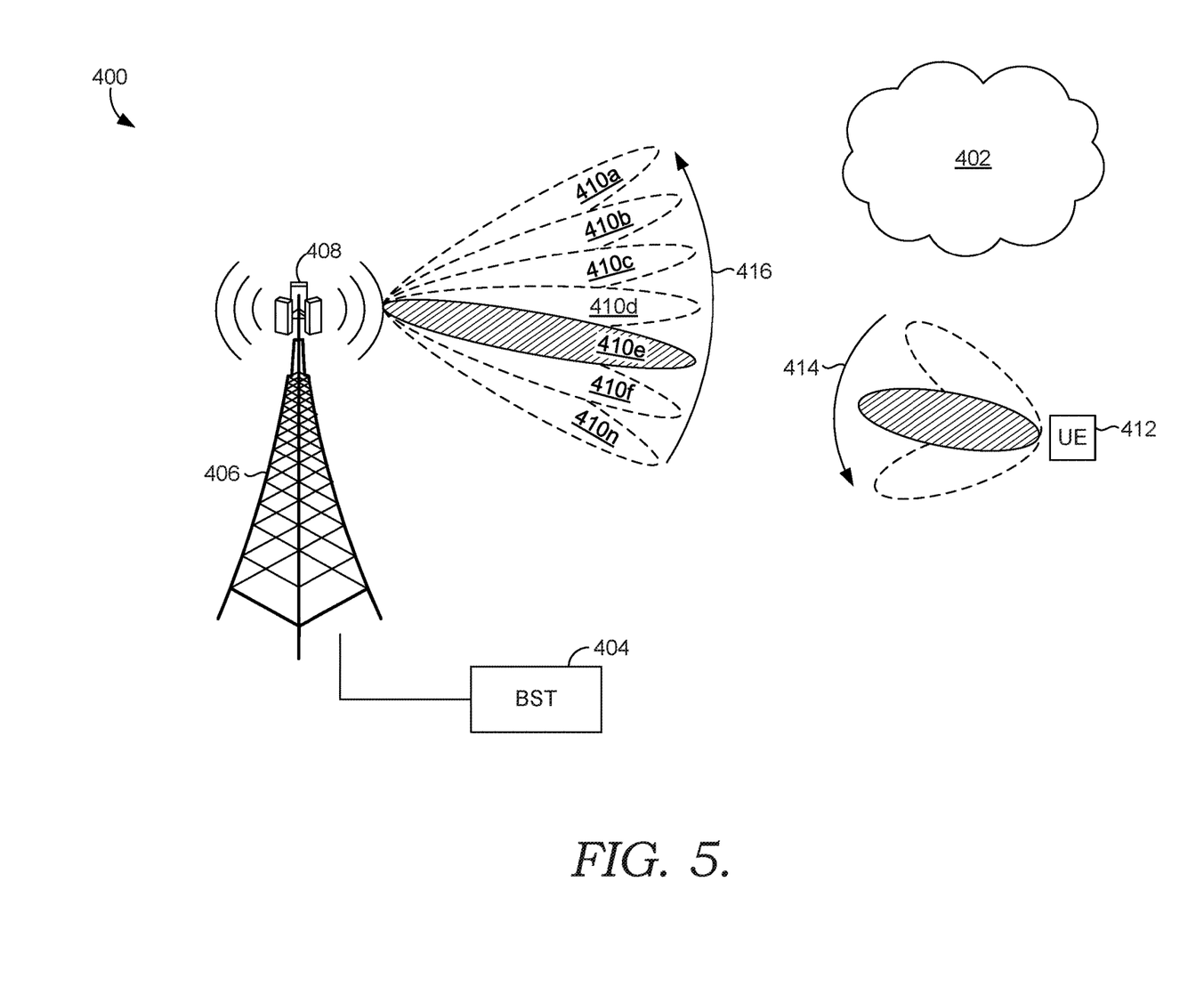

Subsequently, at block 308, the method 300 comprises selecting the second beam that is different from the first beam. The second beam may be selected by a base station, for example, when the condition of the second beam is such that the second beam has a quality, strength, and/or SINR values that are improved over the first beam for which the event was determined. Then, at block 310, the second beam is assigned to currently serve the user equipment in accordance with the method 300. Accordingly, based on determining the event, a second beam is selected and the user equipment is switched from the first beam to the second beam so the second beam becomes the serving beam for the user equipment. For example, FIG. 5 illustrates that the first beam 410b (e.g., as no longer shaded) of the plurality of beams 410a-n of the cell site 406 is no longer currently serving the user equipment 412. Instead, the second beam 410e (e.g., shown as shaded for visual effect) now currently serves the user equipment in order to provide a connection to the network 402 via the base station 404. In some embodiments, the beam assignment module of the system of FIG. 2 may perform aspects of the method 300, including selection of a neighboring beam for beam switching as well as the actual beam switching.

In order to prevent rapid beam switching (e.g., ping-pong effect) between the narrow plurality of beams at the cell site, which degrades service quality, the parameter specifying a threshold may further include a margin that is associated with the threshold, as discussed above with regard to event determination. The margin may be employed to ensure that the condition(s) of the second beam are sufficiently improved over the conditions of the first beam before beam switching, for example. The margin may be employed to ensure that the condition(s) of the first beam have sufficiently deteriorated before beam switching, in another example. Thus, the margin ensures that minor or negligible differences between the condition of the first beam relative to the parameter or the condition of the second beam relative to the parameter do not result, for example, in the user equipment being passed quickly beam switched back and forth between the first beam and other neighboring beams, multiple times over a short period of time (e.g., in a scale of milliseconds to tens of seconds). Similarly, the offset discussed above may be utilized to reduce or prevent rapid beam switching by ensuring that minor or negligible differences between the condition of the first beam relative to the second beam in view of the parameter do not result in the user equipment being bounced between the first beam and other neighboring beams at the cell site, multiple times over a short period of time (e.g., in a scale of milliseconds to tens of seconds).

Figure 6:
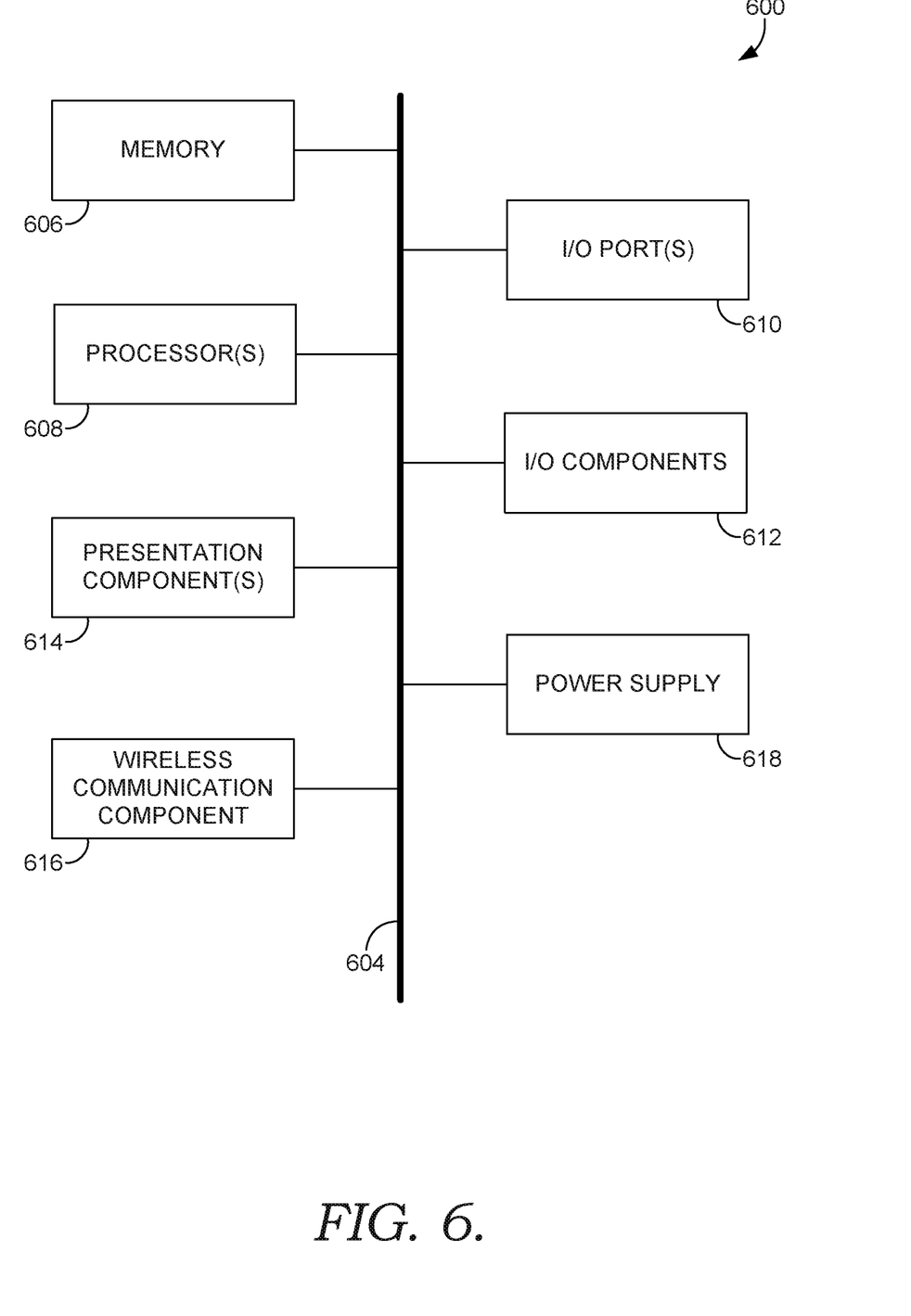
FIG. 6 illustrates a diagram of an example device suitable for operation of an embodiment.

Turning to FIG. 6, it depicts a block diagram of a computing device 600 suitable to implement embodiments of the present invention. It will be understood by those of ordinary skill in the art that the computing device 600 is just one non-limiting example of a suitable computing device and is not intended to limit the scope of use or functionality of the present invention. Similarly, the computing device 600 should not be interpreted as imputing any dependency and/or any requirements with regard to each component and combination(s) of components illustrated in FIG. 6. It will be appreciated by those having ordinary skill in the art that the connections illustrated in FIG. 6 may comprise other methods, hardware, software, and/or devices for establishing a communications link between the components, devices, systems, and entities. Although the connections are depicted using one or more solid lines, it will be understood by those having ordinary skill in the art that the connections of FIG. 6 may be hardwired or wireless, and may use intermediary components that have been omitted or not included in FIG. 6 for simplicity's sake. As such, the absence of components from FIG. 6 should be not be interpreted as limiting the present invention to exclude additional components and combination(s) of components. Moreover, though devices and components are represented in FIG. 6 as singular devices and components, it will be appreciated that some embodiments may include a plurality of the devices and components such that FIG. 6 should not be considered as limiting the number of a devices or components.

Continuing, the computing device 600 may be in the form of a server, in some embodiments. Although illustrated as one component in FIG. 6, the present invention may utilize a plurality of local servers and/or remote servers in the computing device 600. The server may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server may include or may have access to computer-readable media. Computer-readable media may be any available media that may be accessed by server. Computer-readable media may include one or more of volatile media, nonvolatile media, removable media, or non-removable media. By way of a non-limiting example, computer-readable media may include computer storage media and/or communication media. Non-limiting examples of computer storage media may include one or more of volatile media, nonvolatile media, removable media, or non-removable media, may be implemented in any method and/or any technology for storage of information, such as computer-readable instructions, data structures, program modules, or other data. In this regard, non-limiting examples of computer storage media may include Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which may be used to store information and which may be accessed by the server. Generally, computer storage media is non-transitory such that it does not comprise a signal per se.

Communication media may embody computer-readable instructions, data structures, program modules, and/or other data in a modulated data signal, such as a carrier wave or other transport mechanism. Communication media may include any information delivery media. As used herein, the term "modulated data signal" refers to a signal that has one or more of its attributes set or changed in such a manner as to encode information in the signal. Non-limiting examples of communication media may include wired media, such as a wired network connection, a direct-wired connection, and/or a wireless media, such as acoustic, radio frequency (RF), infrared, and other wireless media. Combinations of any of the above also may be included within the scope of computer-readable media.

Continuing with FIG. 6, the a block diagram of a computing device 600 suitable for providing packing instructions is provided, in accordance with an embodiment of the technology. It should be noted that although some components depicted in FIG. 6 are shown in the singular, they may be plural, and the components may be connected in a different, including distributed, configuration. For example, computing device 600 may include multiple processors and/or multiple radios. As shown in FIG. 6, computing device 600 includes a bus 604 that may directly or indirectly connect different components together, including memory 606 and a processor 608. In further embodiments, the computing device 600 may include one or more of an input/output (I/O) port 610, I/O component 612, presentation component 614, or wireless communication component 616, such as a radio transceiver. The computing device 600 may be coupled to a power supply 618, in some embodiments.

Memory 606 may take the form of the memory components described herein. Thus, further elaboration will not be provided here, but it should be noted that memory 606 may include any type of tangible medium that is capable of storing information, such as a database. A database may include any collection of records, data, and/or other information. In one embodiment, memory 606 may include a set of computer-executable instructions that, when executed, facilitate various functions or steps disclosed herein. These instructions will variously be referred to as "instructions" or an "application" for short. Processor 608 may actually be multiple processors that may receive instructions and process them accordingly. Presentation component 614 may include a display, a speaker, a screen, a portable digital device, and/or other components that may present information through visual (e.g., a display, a screen, a lamp, a light-emitting diode (LED), a graphical user interface (GUI), and/or even a lighted keyboard), auditory (e.g., a speaker), haptic feedback, and/or other tactile cues. Wireless communication component 616 may facilitate communication with a network as previously described herein. Additionally or alternatively, the wireless communication component 616 may facilitate other types of wireless communications, such as Wi-Fi, WiMAX, LTE, Bluetooth, and/or other VoIP communications. In various embodiments, the wireless communication component 616 may be configured to concurrently support multiple technologies.

I/O port 610 may take a variety of forms. Exemplary I/O ports may include a USB jack, a stereo jack, an infrared port, a firewire port, and/or other proprietary communications ports. I/O component 612 may comprise one or more keyboards, microphones, speakers, touchscreens, and/or any other item useable to directly or indirectly input data into the computing device 600. Power supply 618 may include batteries, fuel cells, and/or any other component that may act as a power source to supply power to computing device 600 or to other components.

Although internal components of the computing device 600 are not illustrated for simplicity, those of ordinary skill in the art will appreciate that internal components and their interconnection are present in the computing device 600 of FIG. 6. Accordingly, additional details concerning the internal construction of the computing device 600 are not further disclosed herein.

Regarding FIGS. 1 through 6, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments may include a plurality of devices and/or components such that the figures should not be considered as limiting the number of a devices and/or components.

It is noted that embodiments of the present invention described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

What is claimed is:

1. A method for reducing instances of rapid intra-cellular beam switching, the method comprising:
communicating a parameter for detecting an event, the parameter identifying a threshold for at least one physical characteristic;
receiving a signal from a user equipment indicating that a condition of the first beam corresponds to the parameter, wherein the first beam is currently serving the user equipment;
determining, by a base station, that an event occurred for the first beam based on the received signal when the condition of the first beam is outside of a margin of the threshold;
selecting a second beam that is different from the first beam; and assigning the second beam to currently serve the user equipment based on determining the event occurred for the first beam.

2. The method of claim 1, wherein the first beam and the second beam correspond to one cell site.

3. The method of claim 1, wherein the parameter comprises a strength threshold, and wherein the event is determined by the base station when the condition of the first beam is less than the strength threshold less the margin.

4. The method of claim 1, wherein the parameter comprises a quality threshold, and wherein the event is determined by the base station when the condition of the first beam is less than the quality threshold less the margin.

5. The method of claim 1, wherein the parameter comprises a noise threshold, and wherein the event is determined by the base station when the condition of the first beam is less than the noise threshold less the margin.

6. The method of claim 1, wherein the parameter comprises a strength threshold, and wherein the event is further determined when a condition of the second beam that is not currently serving the user device is greater than or equal to the strength threshold.

7. The method of claim 1, wherein the parameter comprises a quality threshold, and wherein the event is further determined when a condition of the second beam that is not currently serving the user device is greater than or equal to the quality threshold.

8. The method of claim 1, wherein the parameter comprises a noise threshold, and wherein the event is further determined when a condition of the second beam that is not currently serving the user device is greater than or equal to the noise threshold.

9. One or more computer-readable storage medium having computer-readable instructions embodied therein for reducing instances of rapid intra-cellular beam switching, the computer-readable instructions comprising:
one or more executable portions configured to perform, when executed via one or more processors:
transmitting one or more parameters from a cell site having a plurality of beams, the plurality of beams including a first beam and a second beam, the one or more parameters identifying a threshold;
receiving a signal from a user equipment indicating a condition of the first beam and a condition of the second beam relative to the threshold, wherein the first beam is currently serving the user equipment;
determining, by the base station, an event occurred based on the received signal when at least one of the condition of the first beam or the condition of the second beam is outside of a margin of the threshold;
selecting the second beam based on determining the event occurred; and
assigning the second beam to currently serve the user equipment based on determining the event occurred.

10. The media of claim 9, wherein the one or more parameters identify a physical layer threshold, and wherein the event is determined to occur when the condition of the first beam less than the physical layer threshold less the margin, and wherein the event is determined independent of the condition of the second beam.

11. The media of claim 9, wherein the one or more parameters identify a physical layer threshold, and wherein the event is determined to occur when the condition of the second beam exceeds the physical layer threshold plus a margin, and wherein the event is determined independent of the condition of the first beam.

12. The media of claim 9, wherein the one or more parameters identify a physical layer threshold, and wherein the event is determined when the condition of the second beam less the margin is greater than the condition of the first beam plus an offset.

13. The media of claim 9, wherein the one or more parameters identify a physical layer threshold, and wherein the event is determined when the condition of the first beam is less than the physical layer threshold less the margin, and the condition of the second beam is greater than the physical layer threshold plus the margin.

14. The media of claim 9, wherein the one or more parameters are communicated in a SS/PBCH signal, and wherein the signal from the user equipment comprises at least one of RSRP, RSRQ, or SINR measurements corresponding to at least one of the condition for the first beam or the condition for the second beam.

15. The media of claim 9, wherein the one or more parameters are communicated in a CSI-RS signal, and wherein the signal from the user equipment comprises at least one of RSRP, RSRQ, or SINR measurements corresponding to at least one of the condition for the first beam or the condition for the second beam.

16. The media of claim 9, wherein the signal from the user equipment corresponds to a SRS signal, the signal comprising at least one of RSRP, RSRQ, or SINR measurements corresponding to at least one of the condition for the first beam or the condition for the second beam.

17. The media of claim 9, wherein the signal from the user equipment corresponds to a CSI signal, the signal comprising at least one of RSRP, RSRQ, or SINR measurements corresponding to at least one of the condition for the first beam or the condition for the second beam.

18. The media of claim 9, wherein the one or more executable portions are configured to perform packaging the one or more parameters as a system information resource block (SIB) for broadcasting over the plurality of beams of the cell site.

19. The media of claim 9, wherein the one or more executable portions are configured to perform communicating instructions to the user equipment to use the one or more parameters to generate the signal that reports at least one of the condition of the first beam or the condition of the second beam.

20. A system comprising:
a gNodeB communicatively coupled with an antenna of a cell site, the gNodeB comprising:
a parameter module for storing a plurality of parameters, the plurality of parameters identifying thresholds for detecting beam events;
a communication module for facilitating transmission of a plurality of beams and the plurality of parameters at the cell site, and for receiving a signal from a user equipment indicating a condition of a first beam of the plurality of beams corresponds to at least one of the plurality of parameters, wherein the first beam is currently serving the user equipment;
an event module for determining an event occurred for the first beam based on the received signal when the condition of the first beam is outside of a margin of at least one of the thresholds of the plurality of parameters; and
a beam assignment module for selecting a second beam that is different from the first beam and assigning the second beam to currently serve the user equipment when the even module determines an event occurred for the first beam.

* * * * *